(12) United States Patent
Nitta (10) Patent No.: US 10,171,822 B2
(45) Date of Patent: Jan. 1, 2019

(54) IMAGE TRANSMISSION DEVICE, IMAGE TRANSMISSION METHOD, AND IMAGE TRANSMISSION PROGRAM

(71) Applicant: CIAO INC., Tokyo (JP)

(72) Inventor: Tomoaki Nitta, Tokyo (JP)

(73) Assignee: CIAO, INC. (JP)

( * ) Notice: Subject to any disclaimer, the term of this patent is extended or adjusted under 35 U.S.C. 154(b) by 105 days.

(21) Appl. No.: 15/430,383

(22) Filed: Feb. 10, 2017

(65) Prior Publication Data

US 2017/0155915 A1 Jun. 1, 2017

Related U.S. Application Data

(63) Continuation-in-part of application No. PCT/JP2015/072531, filed on Aug. 7, 2015.

(30) Foreign Application Priority Data

Aug. 11, 2014 (JP) .................................. 2014-163821

(51) Int. Cl.
*H04N 19/23* (2014.01)
*G06T 7/20* (2017.01)
(Continued)

(52) U.S. Cl.
CPC ............... *H04N 19/23* (2014.11); *G06T 7/20* (2013.01); *H04N 5/272* (2013.01); *H04N 5/77* (2013.01);
(Continued)

(58) Field of Classification Search
CPC . G06T 7/11; G06T 7/254; G06T 7/194; G06T 7/174; H04N 19/146; H04N 19/20; H04N 19/186; H04N 19/182; H04N 19/23
See application file for complete search history.

(56) References Cited

U.S. PATENT DOCUMENTS

| 6,157,675 A | 12/2000 | Mitsuhashi et al. ...... 375/240.01 |
| 6,205,260 B1 * | 3/2001 | Crinon ..................... G06T 7/20 345/634 |

(Continued)

FOREIGN PATENT DOCUMENTS

| EP | 1 120 968 | 1/2001 | ............... H04N 7/26 |
| JP | H06133303 | 5/1994 | ............... G06T 9/00 |

(Continued)

OTHER PUBLICATIONS

International Preliminary Report on Patentability issued in application No. PCT/JP2015/072531, dated Feb. 14, 2017 (12 pgs).

(Continued)

*Primary Examiner* — Jayanti K Patel
*Assistant Examiner* — Shadan E Haghani
(74) *Attorney, Agent, or Firm* — Hayes Soloway P.C.

(57) ABSTRACT

An apparatus for transmitting images includes a base server and an aggregation server. The base server includes: a reference image transmitter; an extracted area computer; and an extracted image transmitter. The aggregation server includes an image synthesizer for synthesizing a moving image based on the reference image data transmitted from the base server, and the image data of the third area extracted out of the each of frames.

7 Claims, 8 Drawing Sheets

(51) Int. Cl.
  *H04N 21/234* (2011.01)
  *H04N 19/137* (2014.01)
  *H04N 5/272* (2006.01)
  *H04N 5/77* (2006.01)
  *H04N 7/18* (2006.01)
  *H04N 21/4223* (2011.01)
  *H04N 21/4728* (2011.01)

(52) U.S. Cl.
  CPC ............ *H04N 7/181* (2013.01); *H04N 19/137* (2014.11); *H04N 21/234* (2013.01); *H04N 21/23418* (2013.01); *H04N 21/4223* (2013.01); *H04N 21/4728* (2013.01)

(56) References Cited

U.S. PATENT DOCUMENTS

| | | | | |
|---|---|---|---|---|
| 6,249,613 | B1* | 6/2001 | Crinon | H04N 19/61 375/E7.081 |
| 2006/0039584 | A1 | 2/2006 | Aichi | 382/107 |
| 2006/0244866 | A1 | 11/2006 | Kishida | 348/699 |
| 2009/0217315 | A1 | 8/2009 | Malik et al. | 725/9 |
| 2012/0169923 | A1 | 7/2012 | Millar et al. | 348/399.1 |
| 2013/0070047 | A1* | 3/2013 | DiGiovanni | H04N 5/222 348/36 |
| 2013/0198794 | A1* | 8/2013 | Dharmapurikar | H04L 65/80 725/118 |
| 2014/0016703 | A1* | 1/2014 | Denoual | H04N 19/00696 375/240.16 |
| 2016/0035037 | A1* | 2/2016 | Bulan | G06Q 40/08 705/4 |

FOREIGN PATENT DOCUMENTS

| | | | |
|---|---|---|---|
| JP | H10240947 | 9/1998 | ............... G06T 7/20 |
| JP | H10336670 | 12/1998 | ........... H04N 19/114 |
| JP | 2006013754 | 1/2006 | ............. H04N 19/00 |
| JP | 2006059252 | 3/2006 | ............. G01B 11/00 |
| JP | 2006260049 | 9/2006 | ............... G06T 7/20 |
| JP | 2010062792 | 3/2010 | ............. H03M 7/30 |
| JP | 2010288230 | 12/2010 | ........... H04N 21/222 |

OTHER PUBLICATIONS

International Search Report and Written Opinion issued in application No. PCT/JP2015/072531, dated Dec. 2, 2015 (15 pgs).
Japanese Office Action issued in application No. 2014-163821, dated Dec. 2, 2015 (8 pgs).
Japanese Office Action issued in application No. 2014-247190, dated Dec. 7, 2015 (11 pgs).
Japanese Office Action issued in application No. 2014-247190, dated Jun. 30, 2016 (8 pgs).
Matsuda, Y., "Technique for compressing a moving image" (with machine translation), TDK Corporation, searched Mar. 12, 2014 <URL: http://www.tdk.co.jp/rechmag/knowledge/200804/index2.htm> (7 pgs).
Takeuchi, K., "Evaluation of Crowd Characteristics by Image Processing" (no translation), J. Archit. Plann. Environ. Eng., AU, No. 486, Aug. 1995, pp. 109-116 (10 pgs).
European Search Report issued in corresponding EPO Patent Appln. Serial No. 15831554.9 dated Feb. 6, 2018 (9 pgs).

* cited by examiner

IMAGE TRANSMISSION DEVICE, IMAGE TRANSMISSION METHOD, AND IMAGE TRANSMISSION PROGRAM

CROSS-REFERENCE TO RELATED APPLICATION

The present application is a continuation-in-part of International Patent Application No. PCT/JP2015/072531 which was filed on Aug. 7, 2015 and claims priority under Article 8 of the Patent Cooperation Treaty (PCT) to Japanese Patent Application No. 2014-163821 which was filed on Aug. 11, 2014. Japanese Patent Application No. 2014-163821 and International Patent Application No. PCT/JP2015/072531 are hereby incorporated by reference in their entirety.

FIELD OF THE INVENTION

The present invention relates to an apparatus for transmitting images taken at an imaging point, a method of doing the same, and a computer-readable storage medium storing a program for doing the same.

BACKGROUND ART

When a moving image is to be transmitted to a remote destination, data of the moving image is compressed in order to reduce an amount of data to be actually transmitted. There have been developed various techniques for compressing data of a moving image. In the basic technique, only areas (difference-generated areas) showing a difference before and after each of frames in a moving image are transmitted (see the non-patent document 1).

PRIOR ART DOCUMENT

Non-Patent Document

Non-patent document 1: "Technique for compressing a moving image" authored by Yuji Matsuda, [online], TDK Corporation, searched on Mar. 12, 2014, Internet, <URL: http://www.tdk.co.jp/rechmag/knowledge/200804/index2.htm>

DISCLOSURE OF THE INVENTION

Problems to be Solved by the Invention

In the case that a moving image is to be obtained by taking images of a plurality of consecutive frames, transmitting the images to a remote destination, and synthesizing the images, when areas showing a difference before and after each of images of a plurality of consecutive frames are extracted as difference-generated areas, a blur and/or residual images are found in the moving image, if a threshold is used to judge whether such a difference is generated. This is because no difference is judged to be generated due to fluctuation of light, even if a difference is actually generated, and vice versa.

In view of the above-mentioned problem, it is an object of the present invention to provide an apparatus for transmitting images, a method of doing the same, and a computer-readable storage medium storing a program for doing the same, all of which are capable of preventing occurrence of a blur and a residual image and reducing an amount of data to be transmitted, in the case that images of a plurality of consecutive frames are transmitted for synthesis of a moving image.

Solution to the Problems

The present invention provides an apparatus for transmitting images including a base server being situated at a point where an image is to be taken, and being connected to an imaging device, and an aggregation server being connected to the base server through an electrical communication channel, the base server including reference image transmitting means for transmitting image data (hereinafter, referred to as "reference image data") of a frame acting as a reference (hereinafter, referred to as "reference frame") to the aggregation server at a predetermined timing among images of a plurality of consecutive frames sequentially obtained through the imaging device, extracted area computing means for selecting an image (hereinafter, referred to as "background image") acting as a background among images of a plurality of consecutive frames sequentially obtained through the imaging device, and sequentially computing a third area surrounding both a first area and a second area for each of frames following the reference frame selected among a plurality of consecutive frames sequentially obtained through the imaging device, the first area being an area in which a difference is generated between an image of the each of frames and the background image, the second area being an area in which a difference is generated between an image of a frame immediately prior to the each of frames and the background image, and extracted image transmitting means for sequentially extracting image data of the third area out of the each of frames, and transmitting the thus extracted image data to the aggregation server, the aggregation server including image synthesizing means for synthesizing a moving image based on the reference image data transmitted from the base server, and the image data of the third area extracted out of the each of frames.

The present invention provides a method of transmitting images through the use of a base server being situated at a point where an image is to be taken, and being connected to an imaging device, and an aggregation server being connected to the base server through an electrical communication channel, the base server carrying out transmitting image data (hereinafter, referred to as "reference image data") of a frame acting as a reference (hereinafter, referred to as "reference frame") to the aggregation server at a predetermined timing among images of a plurality of consecutive frames sequentially obtained through the imaging device, selecting an image (hereinafter, referred to as "background image") acting as a background among images of a plurality of consecutive frames sequentially obtained through the imaging device, and sequentially computing a third area surrounding both a first area and a second area for each of frames following the reference frame selected among a plurality of consecutive frames sequentially obtained through the imaging device, the first area being an area in which a difference is generated between an image of the each of frames and the background image, the second area being an area in which a difference is generated between an image of a frame immediately prior to the each of frames and the background image, and sequentially extracting image data of the third area out of the each of frames, and transmitting the thus extracted image data to the aggregation server, the aggregation server carrying out synthesizing a moving image based on the reference image data transmitted from the base server, and the image data of the third area extracted out of the each of frames.

The present invention provides a computer-readable storage medium storing a program for transmitting images, the program causing a first computer to act as a base server being situated at a point where an image is to be taken, and being connected to an imaging device, and further causing a second computer to act as an aggregation server being connected to the base server through an electrical communication channel, the program including a program causing the first computer to function as reference image transmitting means for transmitting image data (hereinafter, referred to as "reference image data") of a frame acting as a reference (hereinafter, referred to as "reference frame") to the aggregation server at a predetermined timing among images of a plurality of consecutive frames sequentially obtained through the imaging device, extracted area computing means for selecting an image (hereinafter, referred to as "background image") acting as a background among images of a plurality of consecutive frames sequentially obtained through the imaging device, and sequentially computing a third area surrounding both a first area and a second area for each of frames following the reference frame selected among a plurality of consecutive frames sequentially obtained through the imaging device, the first area being an area in which a difference is generated between an image of the each of frames and the background image, the second area being an area in which a difference is generated between an image of a frame immediately prior to the each of frames and the background image, and extracted image transmitting means for sequentially extracting image data of the third area out of the each of frames, and transmitting the thus extracted image data to the aggregation server, the program further including a program causing the second computer to function as image synthesizing means for synthesizing a moving image based on the reference image data transmitted from the base server, and the image data of the third area extracted out of the each of frames.

In the above-mentioned invention, a moving image is generated not by extracting areas showing a difference before and after images in a plurality of consecutive frames, and transmitting the extracted areas to an aggregation server, but by extracting image data of a third area surrounding both a first area and a second area, the first area being an area in which a difference is generated between an image of each of frames in a plurality of consecutive frames and the background image, the second area being an area in which a difference is generated between an image of a frame immediately prior to the each of frames and the background image, and transmitting the extracted image data to an aggregation server. Thus, the areas showing a difference before and after images of a plurality of consecutive frames are scarcely influenced by a blur of lights, ensuring it possible to prevent occurrence of a blur and/or a residual image in a resultant moving image.

Advantages Provided by the Invention

The present invention makes it possible to reduce an amount of data to be transmitted without occurrence of a blur and/or a residual image, when images of a plurality of consecutive frames are transmitted for synthesis of a moving image.

The above and other objects and advantageous features of the present invention will be made apparent from the following description made with reference to the accompanying drawings, in which like reference characters designate the same or similar parts throughout the drawings.

INDICATION BY REFERENCE NUMERALS

1 Apparatus for transmitting images
2 Imaging device
3 Base server
4 Aggregation server
5 Computer
10, 15 Storage means
11 Reference image transmitting means
12 Extracted area computing means
13 Extracted image transmitting means
14 Image synthesizing means
16 Moving image providing means

EMBODIMENT FOR REDUCING THE INVENTION TO PRACTICE

Figure 1:
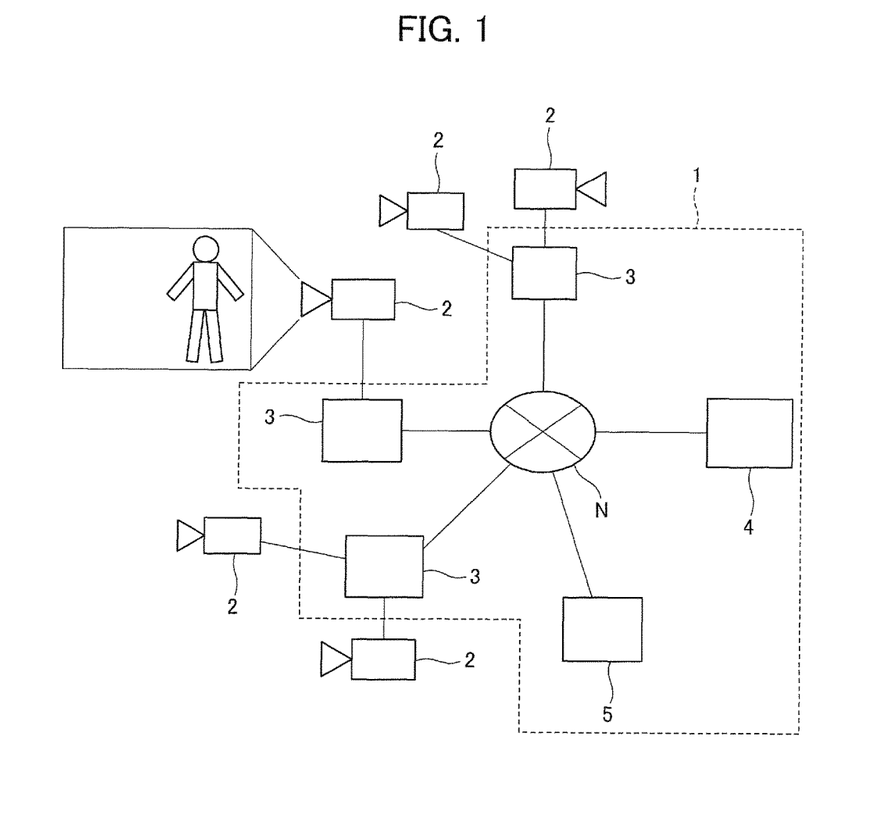
FIG. 1 is a view illustrating the apparatus for transmitting image, in accordance with the embodiment of the present invention.

In FIG. 1, the apparatus 1 for transmitting images, in accordance with the embodiment of the present invention, includes a plurality of base servers 3 each being situated at a point where an image is to be taken, and being connected to an imaging device 2, and an aggregation server 4 being connected to the base server through electrical communication channel N. The imaging device 2 is designed to take still images at a predetermined interval (for instance, $\frac{1}{120}$ to 1 second) to thereby obtain images of a plurality of consecutive frames. Each of the base servers 3 is situated at a point where images are to be taken. Each of the base servers 3 is connected to a single or a plurality of the imaging devices 2.

Figure 2:
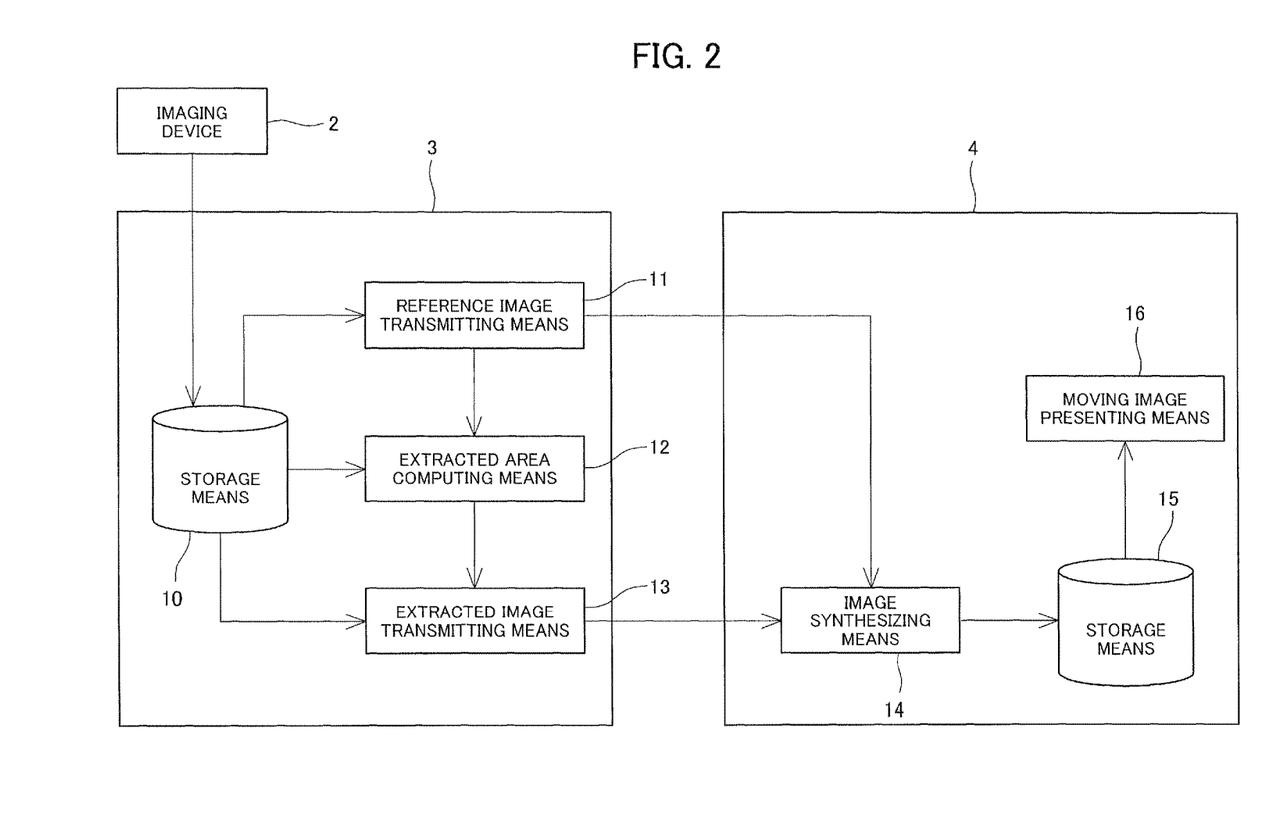
FIG. 2 is a block view of the apparatus illustrated in FIG. 1

As illustrated in FIG. 2, each of the base servers 3 is designed to include a storage means 10 temporarily storing therein images of each of consecutive frames sequentially taken by the imaging devices 2, a reference image transmitting means 11 for transmitting image data (hereinafter, referred to as "reference image data") of a frame acting as a reference (hereinafter, referred to as "reference frame") to the aggregation server 4 at a predetermined timing, an extracted area computing means 12 for computing an area (hereinafter, referred to as "extracted area") out of each of frames following the reference frame in a plurality of frames, and an extracted image transmitting means 13 for sequentially extracting image data of the extracted area out of images in each of frames, and transmitting the thus extracted image data to the aggregation server 4.

Each of the base servers 3 can be realized by executing a program stored in a computer-readable storage medium and causing a computer to act as the above-mentioned means 10 to 13 on a computer such as a broadly used computer, a personal computer, a micro-computer, PDA (personal digital assistant), a pocket computer, a smart phone, a future phone (a handy phone), a portable game machine.

Figure 3:
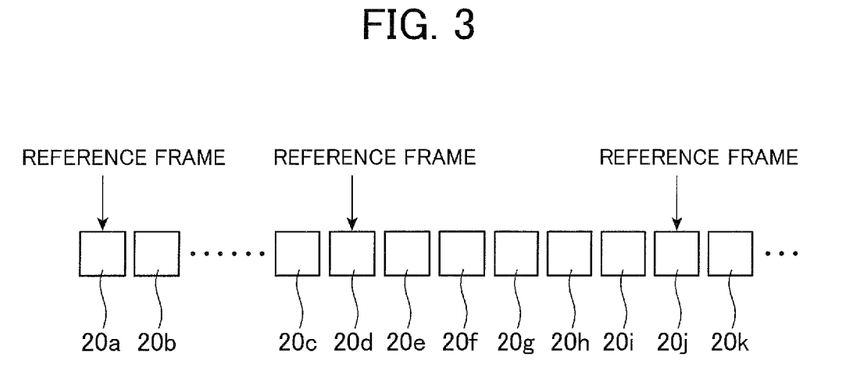
FIG. 3 illustrates images of a plurality of consecutive frames to be sequentially taken by means of an imaging device.

As illustrated in FIG. 3, the reference image transmitting means 11 transmits data of images 20a, 20d and 20j (reference image data) of a frame acting as a reference (reference frame) to the aggregation server 4 at a predetermined timing among images 20a, 20b, - - - , 20c, 20d, 20e, 20f, 20g, 20h, 20i, 20j, 20k, - - - of a plurality of consecutive frames sequentially obtained through the imaging devices 2. The reference frame is determined at a timing such as a predetermined interval (for instance, 30 seconds or a minute) or every predetermined number of frames.

The extracted area computing means 12 selects an image (a background image) acting as a background among images of a plurality of consecutive frames sequentially obtained through the imaging devices 12, and sequentially computes a third area surrounding both a first area and a second area for each of frames following the reference frame selected among a plurality of consecutive frames sequentially obtained through the imaging devices 12, the first area being defined as an area in which a difference is generated between an image of each of the frames and the background image, the second area being defined as an area in which a difference is generated between an image of a frame immediately prior to each of the frames and the background image. The third area defines an area (extracted area) extracted by the extracted image transmitting means 13.

Figure 4A:
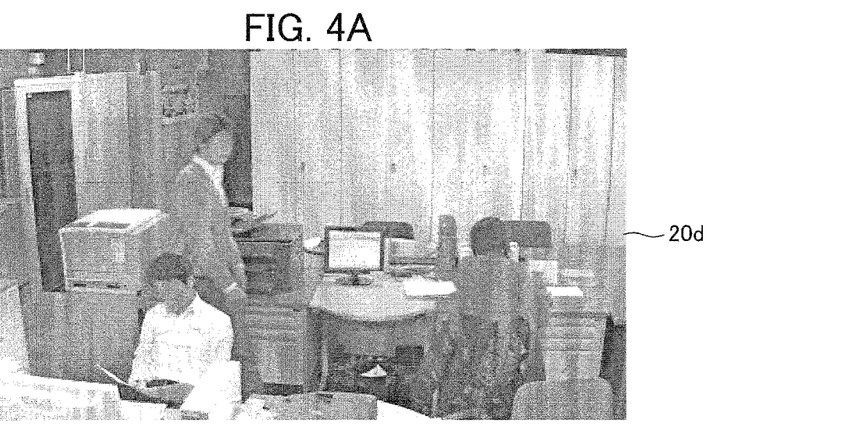
FIG. 4A, FIG. 4B and FIG.4C each illustrates an example of an image in a plurality of frame.
Figure 4B:
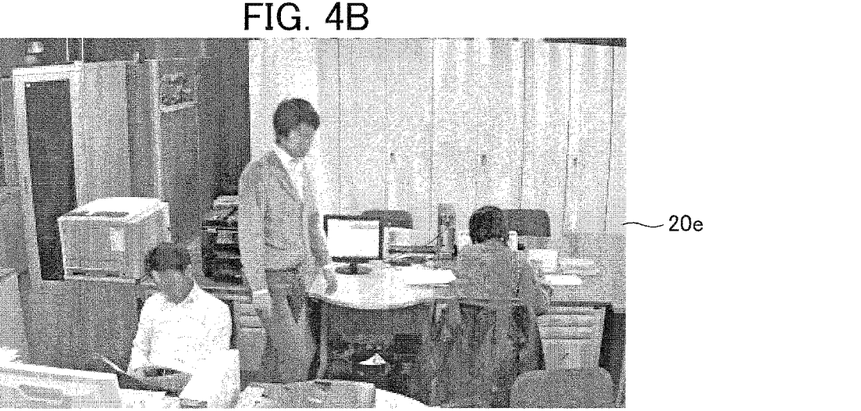
Figure 4C:
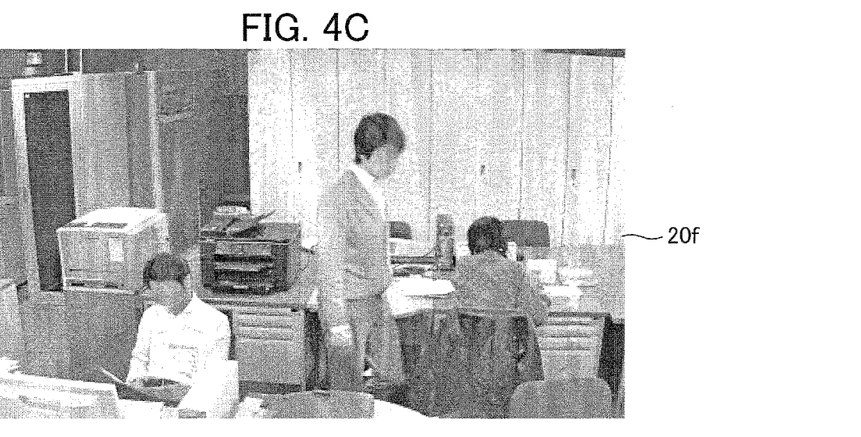
Figure 5A:
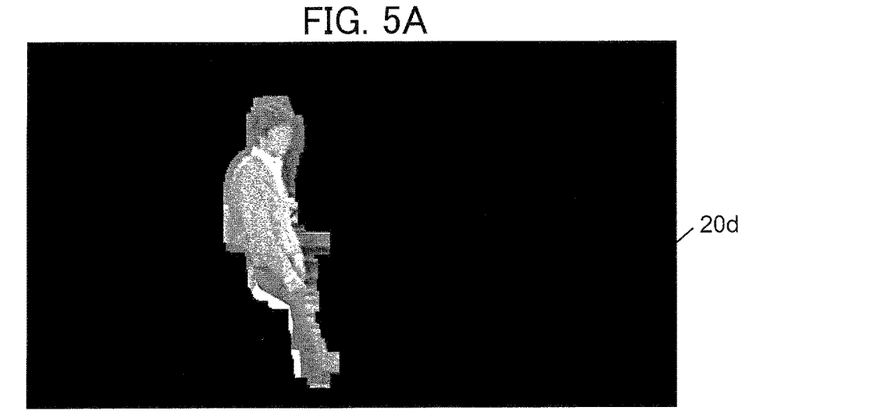
FIG. 5A, FIG. 5B and FIG. 5C each illustrates an example of an image showing a difference between an image in each of the frames shown in FIGS. 4A, 4B and 4C, and a background image thereof.
Figure 5B:
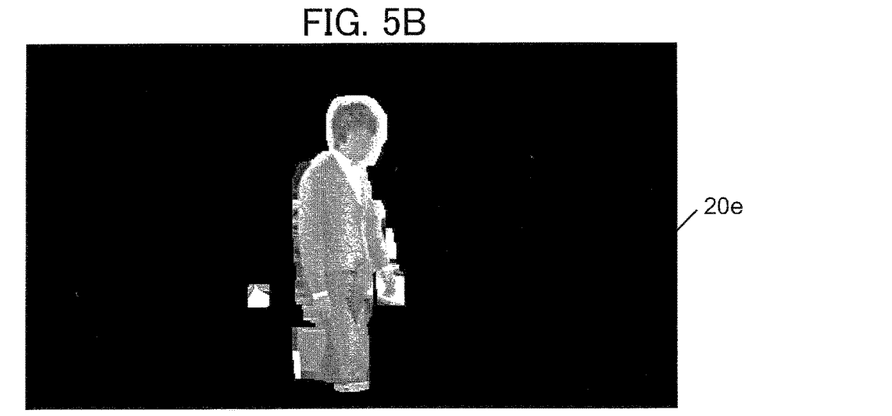
Figure 5C:
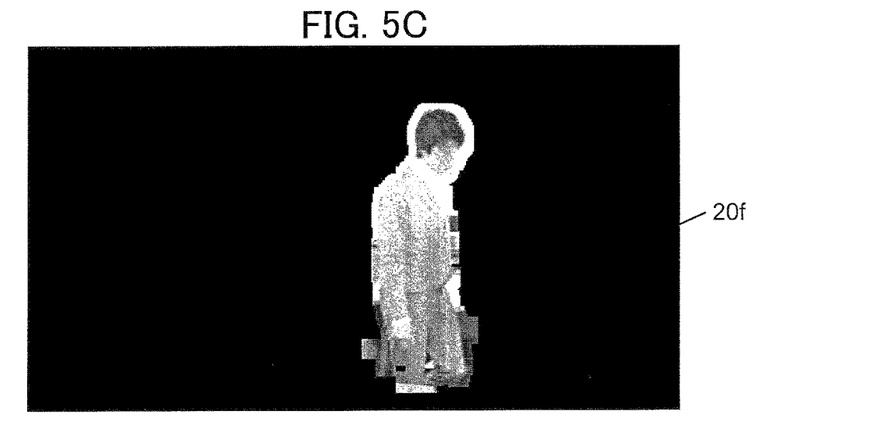

Herein, the background image is obtained by averaging images of a plurality of frames immediately prior to the each of frames. For instance, in the case that an area in which a difference is generated relative to the background image in the frame 20d is to be extracted, the extracted area computing means 12 employs a background image obtained by averaging images of 100 frames prior to the frame 20d, and then, computes a difference between the background image and the frame 20d. FIGS. 4A, 4B and 4C illustrate examples of the frames 20d, 20e and 20f, and FIGS. 5A, 5B and 5C illustrate example of images each showing a difference between the images of each of the frames 20d, 20e and 20f, and each of the background images.

Figure 6A:
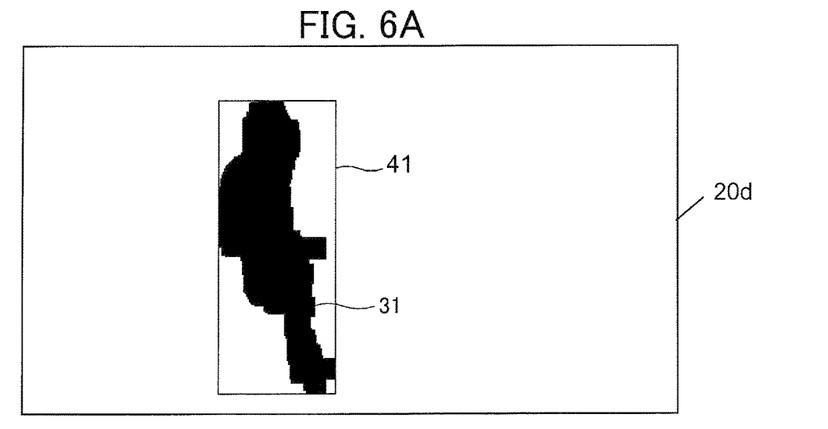
FIG. 6A illustrates an area in which a difference is generated in the frame illustrated in FIG. 4A, and a second area surrounding the area.
Figure 6B:
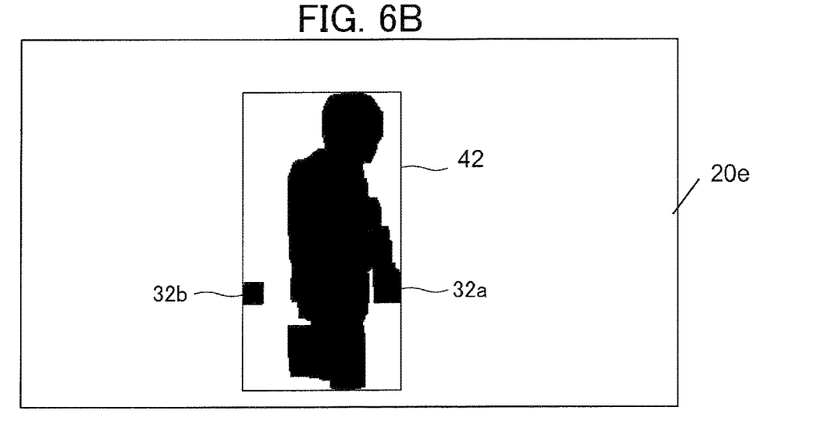
FIG. 6B illustrates an area in which a difference is generated in the frame illustrated in FIG. 4B, and a first area surrounding the area.
Figure 6C:
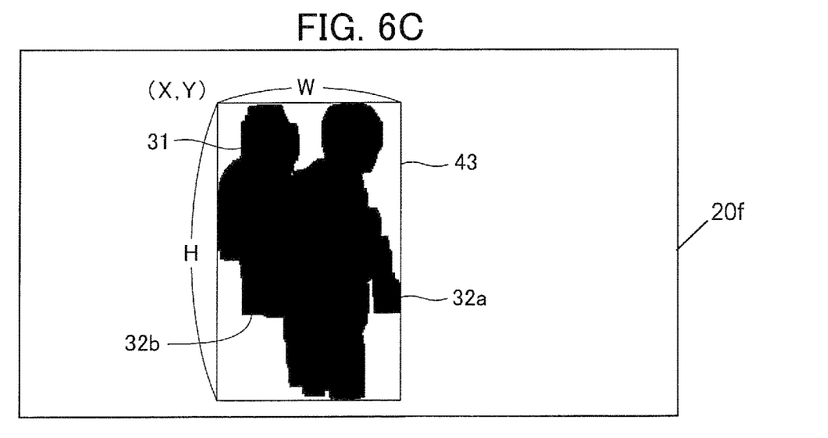
FIG. 6C illustrates a third area surrounding both the area in which a difference is generated in the frame illustrated in FIG. 4A and the area in which a difference is generated in the frame illustrated in FIG. 4B.

The extracted area computing means 12 computes the above-mentioned difference in each of the frames 20e to 20i following the reference frame 20d, and then, computes a third area (the extracted area) surrounding both a first area and a second area. Herein, the first area is defined as an area in which a difference is generated between each of the images of the frames 20e to 20i and the background image, the second area is defined as an area in which a difference is generated between each of the images of the frames 20d to 20h immediately prior to the frames 20e to 20i, respectively, and the background image. FIG. 6A illustrates an area 31 in which a difference is generated in the frame 20d, and a second area 42 surrounding the area 31 therewith. FIG. 6B illustrates areas 32a and 32b in which a difference is generated in the frame 20e, and a first area 41 surrounding the areas 32a and 32b therewith. FIG. 6C illustrates a third area (an extracted area) 43 surrounding both the area 31 in which a difference is generated in the frame 20d, and the areas 32a and 32b in which a difference is generated in the frame 20e.

It should be noted that the extracted area computing means 12 in the present embodiment computes a rectangular area defined with two horizontal lines and two vertical lines for the purpose of simplification of computation, but an area extracted by the extracted area computing means 12 is not to be limited to a rectangular one. The extracted area computing means 12 may compute an area having any shape, if the area could entirely surround a pixel area in which a difference is generated.

The extracted area computing means 12 computes third area information (hereinafter, referred to as "extracted area information") for identifying a location and a size of the third area (the extracted area) in the each of frames. In the example illustrated in FIG. 6C, the extracted area computing means 12 computes coordinates (X, Y) of a left and upper corner of the third area 43, and a size (a width W and a height H) of the third area 43.

The extracted image transmitting means 13 sequentially extracts image data of the third area out of each of frames extracted by the extracted area computing means 12, and transmits the thus extracted image data to the aggregation server 4. In the examples illustrated in FIGS. 4A, 4B and 4C, the extracted image transmitting means 13 extracts image data of the third area 43 illustrated in FIG. 6C, out of image of the frame 20e, as illustrated in FIG. 7, and transmits the thus extracted image data to the aggregation server 4.

The aggregation server 4 includes, as illustrated in FIG. 2, image synthesizing means 14 for synthesizing a moving image based on the reference image data transmitted from the base server 3, and the image data of the third area extracted out of each of frames, a storage means 15 storing the moving image synthesized by the moving image synthesizing means 14, and a moving image presenting a moving image stored in the storage means 15 to a computer 5 (see FIG. 1) connected thereto through the electric communication channel N. The aggregation server 4 can be realized by executing a program stored in a computer-readable storage medium and causing a computer to act as the above-mentioned means 14 to 16 on such a computer as mentioned above.

The image synthesizing means 14 synthesizes a moving image based on the reference image data transmitted from the base server 3, and the image data of the third area extracted out of each of frames, and stores the thus synthesized moving image into the storage means 15. In the present embodiment, the image synthesizing means 14 synthesizes a moving image by sequentially replacing a part of the reference image data with image data of the third area in each of frames, in accordance with the extracted area information of each of frames.

Figure 7:
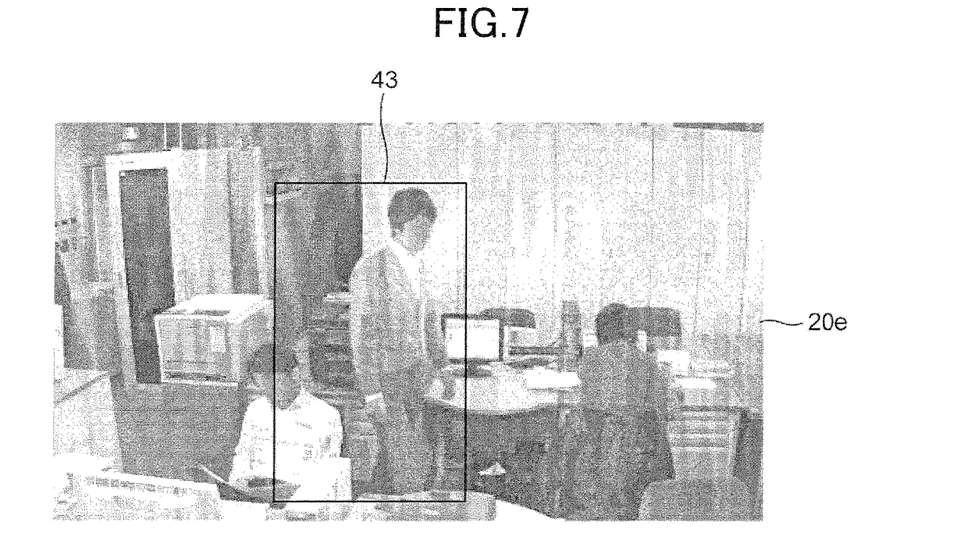
FIG. 7 is a view in which a third area illustrated in FIG. 6C is applied into the frame illustrated in FIG. 4B.
Figure 8:
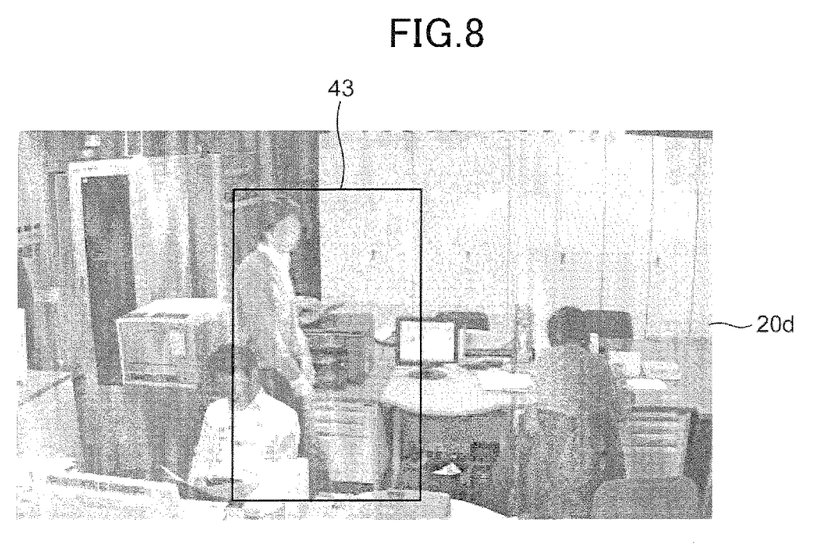
FIG. 8 is a view in which a third area illustrated in FIG. 6C is applied into the frame illustrated in FIG. 4A.

In the examples illustrated in FIGS. 4A, 4B and 4C, the image synthesizing means 14 replaces a part of the image data among the coordinates (X, Y), the width W and the height H, with the image data of the third area 43 in the frame 20e illustrated in FIG. 7, in accordance with the extracted area information of the frame 20e, in the image of the reference frame 20d illustrated in FIG. 8, and defines the thus replaced image data as image data of a frame next to the reference frame 20d. Then, the image synthesizing means 14 replaces image data of the frame 20*e* immediately prior to the frame 20*f* with image data of the third area of the frame 20*f* in accordance with the extracted area information. The image synthesizing means 14 repeats these steps to thereby synthesize a moving image.

The moving image presenting means 16 presents a moving image stored in the storage means 15 upon a request transmitted from the computer 5 connected thereto through the electric communication channel N. When the moving image presenting means 16 receives a request from the computer 5 for transmission of a moving image together with information by which a particular imaging device 2 is identified in each of imaging spots, the moving image presenting means 16 extracts the requested moving image out of the storage means 15, and transmits the thus extracted moving image to the computer 5 through the electric communication channel N.

In the apparatus for transmitting images, having the above-mentioned structure, the reference image transmitting means 11 of each of the base servers 3 located at each of imaging spots transmits image data of the reference image at a predetermined timing among images of a plurality of consecutive frames sequentially obtained by a single imaging device 2 or a plurality of image device 2, to the aggregation server 4. With respect to images of frames following the reference frame, the extracted area transmitting means 13 extracts image data of the third area in each of frames sequentially computed by the extracted area computing means 12, and transmits the thus extracted image data to the aggregation server 4.

The aggregation server 4 synthesizes a moving image, based on both the reference image data received from each of the base servers 3, and image data of the third area in each of the sequentially transmitted frames, and then, stores the thus synthesized moving image into the storage means 15. The aggregation server 4, on receipt of a request from the computer 5 connected thereto through the electric communication channel N, presents the moving image stored in the storage means 15 to the computer 5.

As mentioned above, in the apparatus 1 for transmitting images, in accordance with the present embodiment, a moving image is synthesized not by extracting areas showing a difference before and after each of images in a plurality of consecutive frames, and transmitting the extracted areas to the aggregation server 4, but by extracting image data of the third area (the extracted area) surrounding both the first area and the second area, the first area being an area in which a difference is generated between an image of each of frames in a plurality of consecutive frames and the background image, the second area being an area in which a difference is generated between an image of a frame immediately prior to the each of frames and the background image, and transmitting the extracted image data to the aggregation server 4. Thus, the areas showing a difference before and after images of a plurality of consecutive frames are scarcely influenced by a blur of lights, ensuring it possible to prevent occurrence of a blur and/or a residual image in a resultant moving image, and to reduce an amount of data to be transmitted.

A timing at which the reference frame is selected in the present embodiment is defined as a predetermined period of time or a predetermined number of frames, but it should be noted that other timings may be selected. For instance, a timing in which a predetermined amount of a difference or more (for instance, a timing at which pixels by 80% show a difference) is generated may be selected.

The background image in the present embodiment is defined as an image obtained by averaging images of a plurality of frames immediately prior to each of frames. However, it should be noted that the background image may be defined as an image of the reference frame, or as an image obtained by averaging images of a plurality of frames immediately prior to the reference frame. In the case that the background image is defined as an image of the reference frame, a difference is generated in all frames, and accordingly, an amount of image data to be transmitted unavoidably increases. However, it is possible to prevent generation of a difference by defining the background image as an image of a plurality of frames immediately prior to each of frames, as shown in the present embodiment.

INDUSTRIAL APPLICABILITY

The apparatus for transmitting images, the method of doing the same, and the program stored in a computer-readable storage medium for doing the same all in accordance with the present invention are useful as an apparatus, a method, and a program for transmitting images taken at imaging points such as monitoring points without occurrence of a blur and/or a residual image and with reduction in an amount of image data to be transmitted, and synthesizing a moving image.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. An apparatus for transmitting images, including:
  a base server being situated at a point where an image is to be taken, and being connected to an imaging device; and
  an aggregation server being connected to said base server through an electrical communication channel,
  said base server including:
  reference image transmitter for transmitting image data (hereinafter, referred to as "reference image data") of a frame acting as a reference (hereinafter, referred to as "reference frame") to said aggregation server at a predetermined timing among images of a plurality of consecutive frames sequentially obtained through said imaging device;
  extracted area computer for selecting an image (hereinafter, referred to as "background image") acting as a background among images of a plurality of consecutive frames sequentially obtained through said imaging device, and sequentially computing a third area surrounding both a first area and a second area for each of frames individually following said reference frame selected among a plurality of consecutive frames sequentially obtained through said imaging device, said first area surrounding an area in which a difference is generated between an image of said each of frames and said background image, said second area surrounding an area in which a difference is generated between an image of a frame immediately prior to said each of frames and said background image; and extracted image transmitter for sequentially extracting image data of said third area out of said each of frames, and transmitting the thus extracted image data to said aggregation server, said aggregation server including image synthesizer for synthesizing a moving image based on said reference image data transmitted from said base server, and said image data of said third area extracted out of said each of frames.

2. The apparatus for transmitting images, as set forth in claim 1, wherein said background image is an image obtained by averaging images of a plurality of frames immediately prior to said each of frames.

3. The apparatus for transmitting images, as set forth in claim 1, wherein said background image is an image of said reference frame.

4. The apparatus for transmitting images, as set forth in claim 1, wherein said background image is an image obtained by averaging images of a plurality of frames immediately prior to said reference frame.

5. The apparatus for transmitting images, as set forth in claim 1, wherein said extracted area computer computes information (hereinafter, referred to as "third area information") for identifying a location and a size of said third area in said each of frames, said extracted image transmitter transmits said third area information of said each of frames as well as image data of said third area in said each of frames, and said image synthesizer sequentially replaces a part of said reference image data with image data of said third area in said each of frames, based on said third area information of said each of frames, to thereby synthesize said moving image.

6. A method of transmitting images through the use of:

a base server being situated at a point where an image is to be taken, and being connected to an imaging device; and an aggregation server being connected to said base server through an electrical communication channel, said base server carrying out:

transmitting image data (hereinafter, referred to as "reference image data") of a frame acting as a reference (hereinafter, referred to as "reference frame") to said aggregation server at a predetermined timing among images of a plurality of consecutive frames sequentially obtained through said imaging device;

selecting an image (hereinafter, referred to as "background image") acting as a background among images of a plurality of consecutive frames sequentially obtained through said imaging device, and sequentially computing a third area surrounding both a first area and a second area for each of frames individually following said reference frame selected among a plurality of consecutive frames sequentially obtained through said imaging device, said first area surrounding an area in which a difference is generated between an image of said each of frames and said background image, said second area surrounding an area in which a difference is generated between an image of a frame immediately prior to said each of frames and said background image; and sequentially extracting image data of said third area out of said each of frames, and transmitting the thus extracted image data to said aggregation server, said aggregation server carrying out:

synthesizing a moving image based on said reference image data transmitted from said base server, and said image data of said third area extracted out of said each of frames.

7. A computer-readable storage medium including only non-transitory signals and storing a program for transmitting images, said program causing a first computer to act as a base server being situated at a point where an image is to be taken, and being connected to an imaging device, and further causing a second computer to act as an aggregation server being connected to said base server through an electrical communication channel, said program including a program causing said first computer to function as:

reference image transmitter for transmitting image data (hereinafter, referred to as "reference image data") of a frame acting as a reference (hereinafter, referred to as "reference frame") to said aggregation server at a predetermined timing among images of a plurality of consecutive frames sequentially obtained through said imaging device;

extracted area computer for selecting an image (hereinafter, referred to as "background image") acting as a background among images of a plurality of consecutive frames sequentially obtained through said imaging device, and sequentially computing a third area surrounding both a first area and a second area for each of frames individually following said reference frame selected among a plurality of consecutive frames sequentially obtained through said imaging device, said first area surrounding an area in which a difference is generated between an image of said each of frames and said background image, said second area surrounding an area in which a difference is generated between an image of a frame immediately prior to said each of frames and said background image; and extracted image transmitter for sequentially extracting image data of said third area out of said each of frames, and transmitting the thus extracted image data to said aggregation server, said program further including a program causing said second computer to function as:

image synthesizer for synthesizing a moving image based on said reference image data transmitted from said base server, and said image data of said third area extracted out of said each of frames.

* * * * *